United States Patent
Mattson et al.

(10) Patent No.: US 7,143,864 B2
(45) Date of Patent: Dec. 5, 2006

(54) YAW CONTROL FOR AN AUTOMOTIVE VEHICLE USING STEERING ACTUATORS

(75) Inventors: Keith Glenn Mattson, Livonia, MI (US); Douglas Scott Rhode, Farmington Hills, MI (US); Todd Allen Brown, Dearborn, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 410 days.

(21) Appl. No.: 10/065,246

(22) Filed: Sep. 27, 2002

(65) Prior Publication Data

US 2004/0060765 A1    Apr. 1, 2004

(51) Int. Cl.
*B62D 5/04* (2006.01)

(52) U.S. Cl. ........................................ 180/446; 701/42

(58) Field of Classification Search ................ 180/402, 180/403, 410–415, 421–423, 443–446; 701/41, 701/42
See application file for complete search history.

(56) References Cited

U.S. PATENT DOCUMENTS

| | | | |
|---|---|---|---|
| 4,705,130 A | 11/1987 | Fukunaga et al. | |
| 4,767,588 A | 8/1988 | Ito | |
| 4,840,389 A | 6/1989 | Kawabe et al. | |
| 4,967,865 A | 11/1990 | Schindler | |
| 5,001,636 A | 3/1991 | Shiraishi et al. | |
| 5,001,637 A | 3/1991 | Shiraishi et al. | |
| 5,002,142 A * | 3/1991 | Klosterhaus | 180/444 |
| 5,097,917 A * | 3/1992 | Serizawa et al. | 180/402 |
| 5,159,553 A * | 10/1992 | Karnopp et al. | 701/41 |
| 5,230,396 A * | 7/1993 | Yasui | 180/422 |
| 5,247,441 A | 9/1993 | Serizawa et al. | |
| 5,251,135 A | 10/1993 | Serizawa et al. | |
| 5,257,828 A | 11/1993 | Miller et al. | |
| 5,261,503 A | 11/1993 | Yasui | |
| 5,428,536 A | 6/1995 | Ackermann | |
| 5,524,079 A | 6/1996 | Ishida et al. | |
| 5,576,957 A * | 11/1996 | Asanuma et al. | 701/42 |
| 5,623,409 A | 4/1997 | Miller | |
| 5,694,319 A | 12/1997 | Suissa et al. | |
| 5,703,775 A | 12/1997 | Yamamoto et al. | |
| 5,774,819 A * | 6/1998 | Yamamoto et al. | 701/41 |
| 5,799,745 A | 9/1998 | Fukatani | |

(Continued)

OTHER PUBLICATIONS

Yasuo Shimizu, Toshitake Kawai, Junji Yuzuriha: Improvement in Driver-Vehicle System Performance by Varying Steering Gain with Vehicle Speed and Steering Angle: VGS (Variable Gear-Ratio Steering System) SAE Technical Paper 1999-01-0395.

*Primary Examiner*—Anne Marie Boehler
(74) *Attorney, Agent, or Firm*—Fredrick Owens

(57) ABSTRACT

A stability control system (24) for an automotive vehicle includes a plurality of sensors sensing the dynamic conditions of the vehicle. The sensors include a steering angle sensor (35) and a yaw rate sensor (28). The controller (26) is coupled to the steering angle sensor (35) and the yaw rate sensor (28). The controller (26) determines a desired yaw rate in response to the steering wheel angle input, determines a corrected steering wheel input as a function of the desired yaw rate of an ideal vehicle and the vehicle yaw rate, and controls the road wheel steer angle (front, rear, or both) steering actuator in response to the corrected steering wheel input, the yaw rate and the modified steering wheel input, vehicle speed, lateral acceleration, longitudinal acceleration, yaw rate, steering wheel angle, and road wheel angles.

23 Claims, 4 Drawing Sheets

U.S. PATENT DOCUMENTS

| | | |
|---|---|---|
| 5,845,222 A | 12/1998 | Yamamoto et al. |
| 5,925,083 A | 7/1999 | Ackermann |
| 6,079,513 A | 6/2000 | Nishizaki et al. |
| 6,108,599 A | 8/2000 | Yamamoto et al. |
| 6,178,365 B1* | 1/2001 | Kawagoe et al. ............. 701/41 |
| 6,219,604 B1 | 4/2001 | Dilger et al. |
| 6,240,350 B1 | 5/2001 | Endo |
| 6,523,637 B1* | 2/2003 | Nakano et al. ............. 180/402 |
| 6,637,543 B1* | 10/2003 | Card .......................... 180/446 |
| 6,698,542 B1* | 3/2004 | Nishizaki et al. ........... 180/403 |
| 2001/0032748 A1* | 10/2001 | Demerly ..................... 180/402 |
| 2002/0070070 A1* | 6/2002 | Andonian et al. .......... 180/402 |
| 2004/0026158 A1* | 2/2004 | Rieth et al. ................. 180/402 |

* cited by examiner

YAW CONTROL FOR AN AUTOMOTIVE VEHICLE USING STEERING ACTUATORS

BACKGROUND OF INVENTION

The present invention relates generally to a dynamic behavior control apparatus for an automotive vehicle, and more specifically, to a method and apparatus for controlling the lateral dynamics of the vehicle by controlling the front and/or rear wheel steer angle for the vehicle.

Dynamic control systems for automotive vehicles have recently begun to be offered on various products. Antilock braking systems (ABS) and traction control (TC) control tire slip ratios. More advanced dynamic control systems typically control the side slip angle and yaw response of the vehicle by controlling the tractive forces and/or braking torque at the various wheels of the vehicle. Side slip and yaw control systems typically compare the desired direction, yaw response, and lateral acceleration of the vehicle based upon the steering wheel angle, speed, and the direction of travel to an ideal (stable) vehicle model. By regulating the amount of braking torque and tractive friction at each corner of the vehicle, the desired path of travel and yaw rate may be maintained.

The yaw control systems mentioned above thus do not control the lateral or yaw response by controlling steering of the front wheels directly. Because of this, front independent control of steady state and dynamic response occurs. However, by having closed loop control over front or rear wheel steer angle, some tradeoffs between the vehicle steady state lateral dynamics and stability and the vehicle transient lateral dynamic response may be achieved.

It would therefore be desirable to provide a closed-loop control system that allows the transient lateral response and the steady state lateral gain and stability to be maintained, optimized, controlled, and/or tailored.

SUMMARY OF INVENTION

The present invention utilizes a steer-by-wire or smart road-wheel actuator system that allows a high level of control over the transient and steady state and dynamic response of the vehicle without the typical constraints of brake controlled vehicles. The present invention uses closed-loop electronic control of the steering wheel actuator to achieve this.

In one aspect of the invention, an automotive vehicle having a steering road wheel actuator includes a yaw rate sensor generating a yaw rate signal corresponding to the yaw rate of the vehicle and a steering wheel angle sensor generating a steering wheel angle signal. A feedback controller and feed forward controller are coupled to the steering road wheel actuator using inputs from the yaw rate sensor and the steering wheel angle sensor. The feed forward controller calculates a desired yaw rate in response to the steering wheel angle, and determines a corrected steering wheel input as a function of the desired yaw rate. The feedback controller then compares the actual and desired vehicle yaw rate, and controls the road wheel steering actuator in response to the corrected steering wheel input, the yaw rate and the modified steering wheel input to provide a steering angle that will result in a desired vehicle dynamic response.

In a further aspect of the invention, a method for controlling an automotive vehicle having a steering actuator includes measuring a steering wheel angle from a steering wheel angle sensor, determining a desired yaw rate in response to the steering wheel angle, determining a modified steering wheel input in response to the desired yaw rate, measuring a vehicle yaw rate from a yaw rate sensor, determining a corrected steering wheel input as a function of the desired yaw rate and the vehicle yaw rate, and controlling the steering actuator in response to the corrected steering wheel input.

One advantage of the invention is that such systems may be easily implemented into a steer-by-wire system. Another advantage of the invention is that great flexibility in controlling the vehicle lateral dynamic response independent of the steady state response is achieved. For example, a defined transient yaw response independent of the steady state yaw gain of the uncontrolled vehicle may be achieved. For example, the defined transient yaw response can be controlled such that it has critical yaw damping while the steady state gain is that of an under-steered vehicle (which is under-damped). The vehicle yaw gain thus reaches a maximum value at the characteristic speed then decreases as the speed increases further. This is generally considered a safer response. Also, the ability to increase the perceived linear range of the vehicle lateral response by independently changing the steering wheel to road wheel steer angle ratio. For example, road wheel angle/steering wheel gain can increase as lateral acceleration increases (in a closed-loop control) to extend the perceived line or range response of the vehicle. The vehicle yaw response increases as driver steering input increases for a given speed to provide improved vehicle response using closed-loop control. This can be tailored in software according to the desired vehicle driving/handling characteristics.

Other advantages and features of the present invention will become apparent when viewed in light of the detailed description of the preferred embodiment when taken in conjunction with the attached drawings and appended claims.

DETAILED DESCRIPTION

A method according to the present invention is intended for use with yaw control systems implemented with electronically controlled or electrically actuated steering systems in automotive vehicles. However, the invention could easily be adapted for use in yaw control systems on other motor vehicles, such as watercraft and aircraft as well as on other vehicle systems, such as active tilt, rollover control or active suspension. While the example set forth herein is described with respect to a yaw rate signal, various lateral dynamic conditions may be used such as side slip angle, lateral acceleration and curvature response gain.

Figure 1:
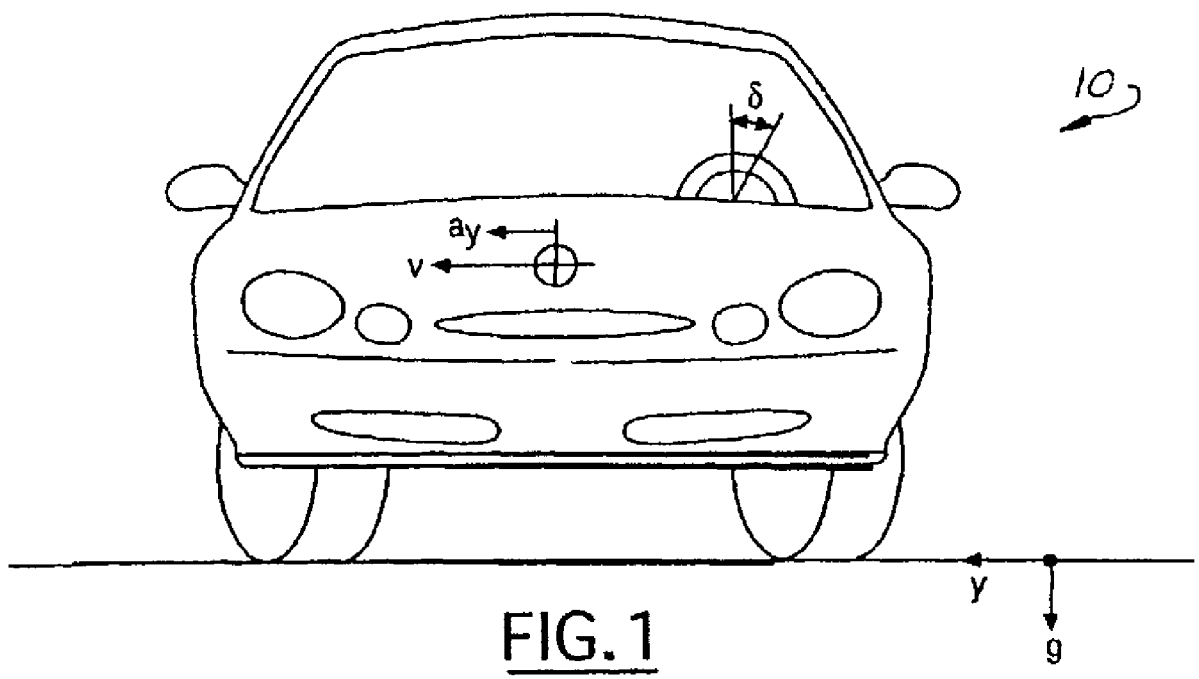
FIG. 1 is a front view of a motor vehicle illustrating various operating parameters of a vehicle experiencing a turning maneuver on a road surface.
Figure 2:
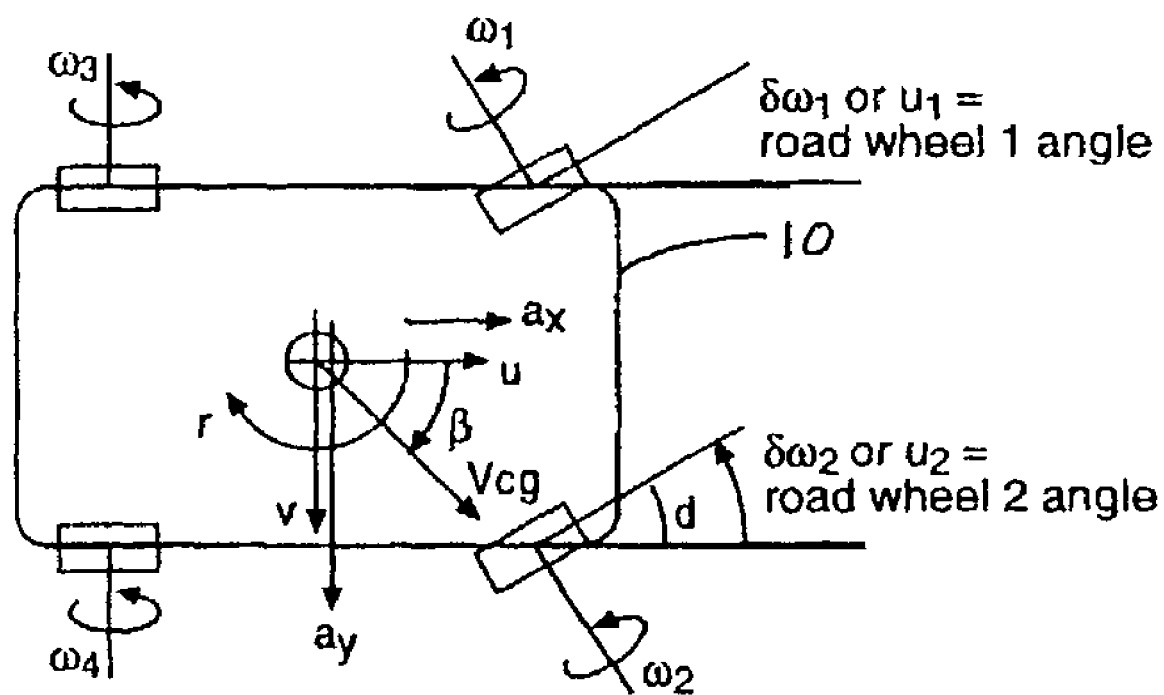
FIG. 2 is a top view of a motor vehicle illustrating various operating parameters of a vehicle experiencing a turning maneuver on a road surface.

Referring now to FIGS. 1 and 2, various operating parameters and variables used by the present invention are illustrated as they relate to the application of the present invention to a ground based motor vehicle 10. Those skilled in the art will immediately recognize the basic physics represented by these illustrations, thereby make the adaptation to different types of vehicles easily within their reach. Lateral acceleration is represented by $a_y$, longitudinal acceleration is represented by $a_x$, yaw rate is represented by r, the steering wheel angle is $\delta$, and road wheel angles $u_1$, $u_2$.

Figure 3:
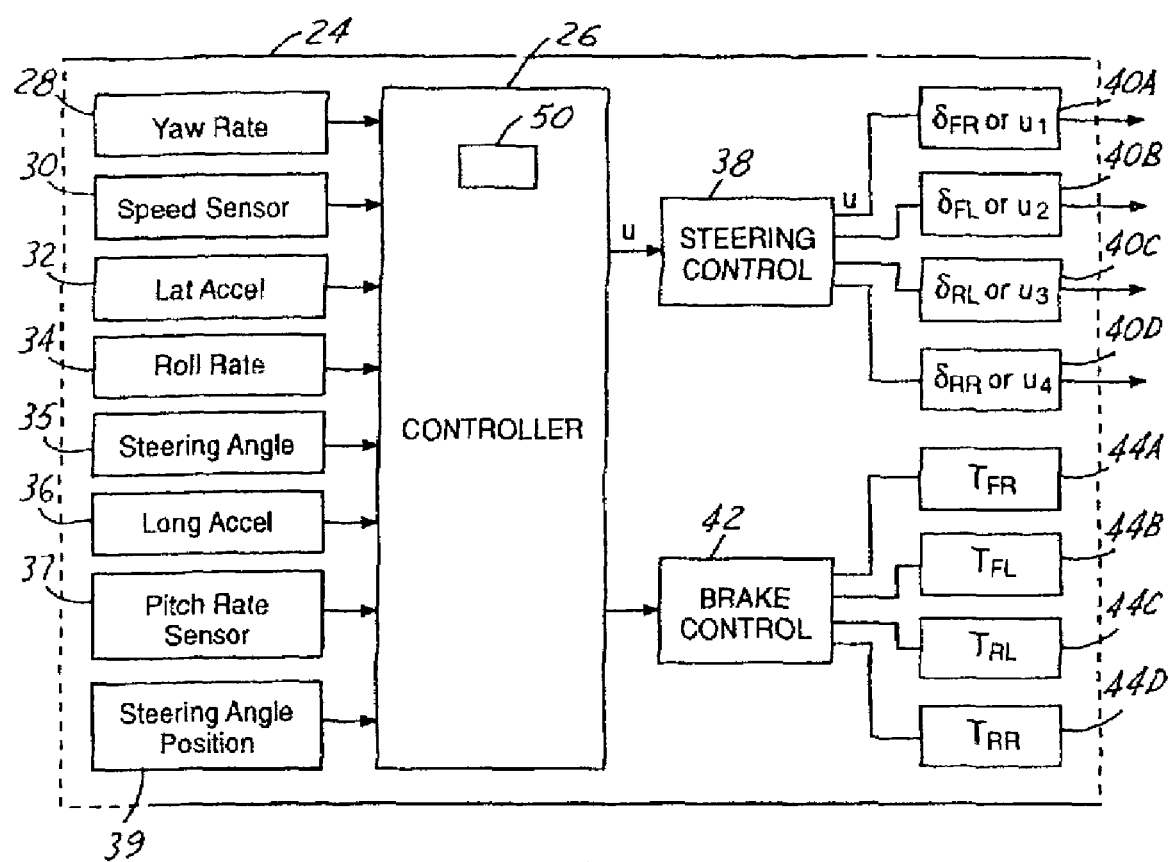
FIG. 3 is a block diagram showing a portion of a microprocessor interconnected to sensors and controlled devices, which may be included in a system according to the present invention.

Referring now to FIG. 3, stability control system 24 has a controller 26 used for receiving information from a number of sensors which may include a yaw rate sensor 28, a speed sensor 30, a lateral acceleration sensor 32, a roll rate sensor 34, a steering angle (hand wheel position) sensor 35, a longitudinal acceleration sensor 36, a pitch rate sensor 37, and steering angle position sensor 39. Steering angle position sensor 39 senses the position of the steered road wheels. Lateral acceleration, longitudinal acceleration, yaw rate, roll orientation and speed may also be obtained using a global positioning system (GPS). Based upon inputs from the sensors, controller 26 controls the road wheel steering angle. Depending on the desired sensitivity of the system and various other factors, not all the sensors 28-39 may be used in a commercial embodiment. Other factors may be obtained from the sensors such as the surface mu and the vehicle side slip angle, $\beta$.

Roll rate sensor 34 and pitch rate sensor 37 may sense the roll condition to be used with a rollover control system as an extension of the present application.

Steering control 38 may control a position of the front right wheel actuator 40A, the front left wheel actuator 40B, the rear left wheel actuator 40C, and the right rear wheel actuator 40D. Although as described above, two or more of the actuators may be simultaneously controlled as one actuator. The actual positions are sensed by steering angle position sensor 39. For example, in a rack-and-pinion system, the two wheels coupled thereto are simultaneously controlled. Based on the inputs from sensors 28 through 39, controller 26 determines the vehicle dynamic condition and controls the steering position of the wheels. Controller 26 may also use brake control 42 coupled to front right brakes 44A, front left brakes 44B, rear left brakes 44C, and right rear brakes 44D. By using brakes in addition to steering control some control benefits may be achieved. For example, yaw control and rollover control may be simultaneously accomplished. That is, controller 26 may be used to apply a brake force distribution to the brake actuators in a manner described in U.S. Pat. No. 6,263,261, which is hereby incorporated by reference. Or, conditions when one or the other is more effective.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. Speed may also be obtained from a transmission sensor. For example, if speed is determined while speeding up or braking around a corner, the lowest or highest wheel speed may be not used because of its error. Also, a transmission sensor may be used to determine vehicle speed.

Controller 26 has a feedback and feed forward control system therein for modifying the steering input to the steering controller 38.

Figure 4:
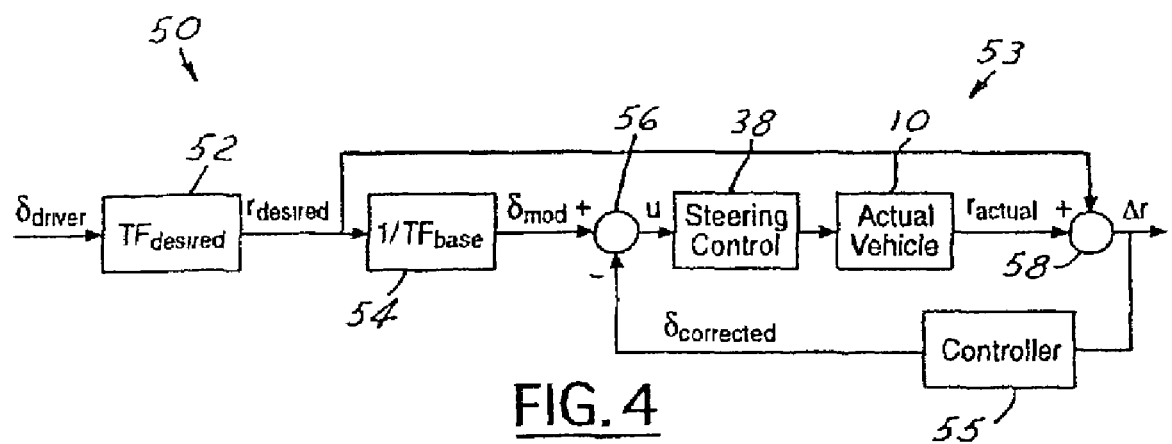
FIG. 4 is a control system block diagram in accordance with the present invention (only yaw control shown).

Referring now to FIG. 4, a feed forward/feedback control system 50 that may be implemented partially or fully in software in controller 26 is illustrated. Control system 50 receives the steering wheel angle $\delta_{driver}$ into a transfer function block 52. The transfer function block 52 outputs a desired yaw response $r_{desired}$ in response to the steering wheel angle measured by the steering wheel angle sensor. The desired yaw rate $r_{desired}$ is applied to feed forward controller 53 which has a block 54 that has a transfer function for the yaw response of the base vehicle model. The output of block 54 of feed forward controller 53 is the modified steering wheel input $\delta_{mod}$ that will give the desired yaw response for the base vehicle model. The modified steering wheel input $\delta_{mod}$ is applied to a summing block 56 of the feed forward controller 53. The summing block 56 receives feedback as to a corrected steering wheel angle $\delta_{corrected}$ as will be further described below. The modified steering wheel angle $\delta_{mod}$ is combined with the corrected steering wheel angle $\delta_{corrected}$ and in this case is subtracted to form the actual commanded steering input u to vehicle 10. From the vehicle the measured yaw rate from the yaw rate sensor $r_{actual}$ is obtained and applied to a summing block 58 of the feed forward controller 53. Summing block 58 receives the desired yaw rate $r_{desired}$ and the actual yaw rate $r_{actual}$ and generates an error in yaw rate, $\Delta r$. The yaw rate desired is subtracted from the actual yaw rate to obtain the yaw rate error, $\Delta r$.

The feedback steering controller 55 receives the error in yaw rate signal $\Delta r$ and generates the corrected road wheel steering input $\delta_{corrected}$. As mentioned above, the corrected road wheel steer angle is input to summing block 56. Controller 55 may use various types of input to determine the corrected steering wheel angle such as the error in yaw rate, the lateral acceleration, the vehicle speed, longitudinal acceleration, pitch rate, and/or the steering wheel angle position.

By providing a feed forward control, lag times can be minimized and the gain required in the feedback loop controller 55 can be minimized, thus achieving the ideal yaw response of the base vehicle model in an optimal, robust manner. The key feature of feedback control is that it provides the ideal yaw response regardless of physical variations within the vehicle; i.e. feedback control decreases the sensitivity of the vehicle yaw response to parameter variations such as vehicle loading, manufacturing variation, tires, and mileage degradation, etc.

In operation, various types of steering control may be performed depending on the vehicle characteristics and the steering system. For example, as described above a front rack system can provide a desired change in the front steering angle temporarily while leaving the rear wheel steer angle unchanged. Of course, the steer angle of the rear wheels could also be controlled to optimize the vehicle response to a driver steering input.

In a system having independently activated front wheels, the relative steering angle between the front wheels may be changed by steering control 38 without changing the position or controlling the position of the rear wheel. This may be done by independent control of the front wheels or simultaneous control of the front wheels.

In a system having independently activated rear wheels, the relative steering angle between the front wheels may be changed by steering control 38 without changing the position or controlling the position of the front wheels. This may be done by independent control of the rear wheels or simultaneous control of the rear wheels.

While particular embodiments of the invention have been shown and described, numerous variations and alternate embodiments will occur to those skilled in the art. Accordingly, it is intended that the invention be limited only in terms of the appended claims.

The invention claimed is:

1. A control system for an automotive vehicle having a steering actuator comprising:
   a lateral dynamic sensor generating a lateral dynamic signal corresponding to a condition of the vehicle;
   a steering wheel angle sensor generating a steering wheel angle signal; and
   a controller coupled to the steering actuator, the lateral dynamic sensor and the steering wheel angle sensor, said controller having
      a first transfer function block determining a desired lateral dynamic condition in response to the steering wheel angle signal,
      a second transfer function block determining a modified steering wheel input as a function of the desired lateral dynamic condition on the basis of a base vehicle model,
      a correction control block determining a corrected steering wheel input as a function of the desired lateral dynamic condition and the actual lateral dynamic condition, and
      a steering wheel input calculation block calculating a steering wheel input in response to the corrected steering wheel input and the modified steering wheel input, the corrected steering wheel input and the modified steering wheel input in a parallel input relationship with each other, wherein the controller controls the steering actuator on the basis of the calculated steering wheel input.

2. A system as recited in claim 1 wherein said steering actuator comprises a front right wheel actuator and a front left wheel actuator.

3. A system as recited in claim 2 wherein said front right wheel steering actuator and said front left steering actuator are independently controllable.

4. A system as recited in claim 3 wherein said controller generates a front right control signal and a front left control signal in response to the corrected steering wheel input and the modified steering wheel input.

5. A system as recited in claim 1 wherein the lateral dynamic sensor comprises a lateral acceleration sensor generating a lateral acceleration signal, said system further comprising a speed sensor generating a vehicle speed signal, said controller determining the corrected steering wheel input as a function of the lateral acceleration signal and the vehicle speed signal.

6. A system as recited in claim 1 wherein said steering actuator comprises a rear steering actuator and a front steering actuator.

7. A system as recited in claim 1 wherein said controller determines a rear steering control signal in response to the corrected steering wheel input and the modified steering wheel input.

8. A control system as recited in claim 1 wherein the lateral dynamic condition comprises yaw rate.

9. A method of controlling a vehicle having a steering actuator comprising:
   measuring a steering wheel angle from a steering wheel angle sensor;
   measuring an actual yaw rate;
   determining a desired yaw rate in response to the steering wheel angle;
   determining a modified steering wheel input in response to the desired yaw rate;
   determining a corrected steering wheel input as a function of the desired yaw rate and the actual yaw rate;
   calculating a steering wheel input in response to the corrected steering wheel input and the modified steering wheel input; and
   controlling the steering actuator in response to the sum of the corrected steering wheel input and the modified steering wheel input.

10. A method as recited in claim 8 further comprising generating a lateral acceleration signal from the condition sensor, generating a vehicle speed signal from a speed sensor, wherein determining a corrected steering wheel input comprises determining a corrected steering input as a function of the desired yaw rate, the actual yaw rate, the lateral acceleration signal, and the vehicle speed signal.

11. A method as recited in claim 9 wherein controlling the steering actuator comprises controlling a front steering actuator in response to the corrected steering wheel input, and the modified steering wheel input.

12. A method as recited in claim 9 wherein controlling the steering actuator comprises controlling a rear steering actuator in response to the corrected steering wheel input, and the modified steering wheel input.

13. A method as recited in claim 9 wherein controlling the steering actuator comprises controlling a front right steering actuator in response to the corrected steering wheel input, and the modified steering wheel input.

14. A method as recited in claim 9 wherein controlling the steering actuator comprises controlling a front left steering actuator in response to the corrected steering wheel input, and the modified steering wheel input.

15. A method of controlling a vehicle having a steering actuator comprising:
   measuring a steering wheel angle from a steering wheel angle sensor;
   determining a desired yaw rate in response to the steering wheel angle;
   feeding forward the desired yaw rate to form a feed forward desired yaw rate;
   determining a modified steering wheel input in response to the desired yaw rate;
   measuring a vehicle yaw rate from a yaw rate sensor;
   determining a yaw rate error as a function of the feed forward desired yaw rate and the vehicle yaw rate;
   determining a corrected steering wheel input in response to the yaw rate error;
   determining a steering actuator input as a function of the corrected steering wheel input and the modified steering wheel input; and
   controlling the steering actuator m response to the steering actuator input.

16. A method as recited in claim 15 further comprising generating a lateral acceleration signal from a lateral acceleration sensor, generating a vehicle speed signal from a speed sensor, wherein determining a corrected steering wheel input comprises determining a corrected steering input as a function of the desired yaw rate and the vehicle yaw rate, the lateral acceleration signal and the vehicle speed signal.

17. A method as recited in claim 15 wherein controlling the steering actuator comprises controlling a front steering actuator in response to the corrected steering wheel input arid the modified steering wheel input.

18. A method as recited in claim 15 wherein controlling the steering actuator comprises controlling a rear steering actuator in response to the corrected steer angle input and the modified steering wheel input.

19. A method as recited in claim 15 wherein controlling the steering actuator comprises controlling a front right steering actuator in response to the corrected steering wheel input and the modified steering wheel input.

20. A method as recited in claim 15 wherein controlling the steering actuator comprises controlling a front left steering actuator in response to the corrected steering wheel input and the modified steering wheel input.

21. A method as recited in claim 15 wherein controlling the steering actuator comprises controlling a rear left steering actuator in response to the corrected steering wheel input and the modified steering wheel input.

22. A method as recited in claim 15 wherein controlling the steering actuator comprises controlling a rear right steering actuator in response to the corrected steering wheel input and the modified steering wheel input.

23. An automotive vehicle having a steering road wheel actuator comprises;
   a yaw rate sensor generating a yaw rate signal corresponding to the actual yaw rate of the vehicle;
   a steering wheel angle sensor generating a steering wheel angle signal;
   a feedback controller and a feed forward controller coupled to the steering road wheel actuator using inputs from the yaw rate sensor and the steering wheel angle sensor, the feed forward controller calculates a desired yaw rate in response to the steering wheel angle, the feedback controller compares the actual yaw rate and a desired yaw rate to form a yaw rate error, determines a corrected steering wheel input as a function of the yaw rate error, the feedback controller controls the road wheel steering actuator in response to the corrected steering wheel input, and the modified steering wheel input determined as a function of the desired yaw rate to provide a steering angle that will result in a desired vehicle dynamic response.

\* \* \* \* \*

UNITED STATES PATENT AND TRADEMARK OFFICE
CERTIFICATE OF CORRECTION

| | | |
|---|---|---|
| PATENT NO. | : 7,143,864 B2 | Page 1 of 1 |
| APPLICATION NO. | : 10/065246 | |
| DATED | : December 5, 2006 | |
| INVENTOR(S) | : Keith Glenn Mattson, Doulas Scott Rhode and Todd Allen Brown | |

It is certified that error appears in the above-identified patent and that said Letters Patent is hereby corrected as shown below:

Column 6, Line 9, should read as follows: -- 10. A method as recited in claim 9 further comprising --

Column 6, Line 63, should read as follows: -- and the modified steering wheel input. --

Signed and Sealed this

Thirtieth Day of January, 2007

JON W. DUDAS
*Director of the United States Patent and Trademark Office*